US009351264B2

(12) United States Patent
Kim et al.

(10) Patent No.: US 9,351,264 B2
(45) Date of Patent: May 24, 2016

(54) METHOD AND APPARATUS FOR DETECTING CELL OUTAGE AND CONTROLLING TRANSMISSION POWER

(71) Applicant: Samsung Electronics Co., Ltd, Gyeonggi-do (KR)

(72) Inventors: Bong-Chan Kim, Gyeonggi-do (KR); Byoung-Ha Yi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 154 days.

(21) Appl. No.: 14/046,794

(22) Filed: Oct. 4, 2013

(65) Prior Publication Data
US 2014/0099942 A1 Apr. 10, 2014

(30) Foreign Application Priority Data
Oct. 5, 2012 (KR) .................. 10-2012-0110719

(51) Int. Cl.
*H04W 36/00* (2009.01)
*H04W 52/44* (2009.01)
*H04W 52/40* (2009.01)
*H04W 52/22* (2009.01)
*H04W 52/28* (2009.01)
*H04W 52/36* (2009.01)

(52) U.S. Cl.
CPC .............. *H04W 52/44* (2013.01); *H04W 52/40* (2013.01); *H04W 52/225* (2013.01); *H04W 52/281* (2013.01); *H04W 52/367* (2013.01)

(58) Field of Classification Search
USPC .................. 455/436, 439, 440, 442, 444, 446, 455/452.2, 453, 522, 524–526, 513, 15.3; 370/331, 332, 333
See application file for complete search history.

(56) References Cited

U.S. PATENT DOCUMENTS

| 8,630,652 | B2* | 1/2014 | Monogioudis ................ 455/446 |
| 2008/0279157 | A1* | 11/2008 | Cuffaro ................. H04W 24/10 370/336 |
| 2011/0244853 | A1 | 10/2011 | Sheikh et al. |
| 2011/0269459 | A1* | 11/2011 | Koo et al. ..................... 455/434 |
| 2012/0055495 | A1* | 3/2012 | Dahan ..................... A24C 5/02 131/289 |
| 2012/0275322 | A1* | 11/2012 | Ji .......................... H04L 1/0027 370/252 |
| 2012/0276936 | A1* | 11/2012 | Ahn et al. ..................... 455/501 |
| 2012/0329460 | A1* | 12/2012 | Huang ................... H04B 7/024 455/436 |
| 2013/0215857 | A1* | 8/2013 | Wu ..................... H04W 52/143 370/329 |
| 2013/0295920 | A1* | 11/2013 | Viswanadham ...... H04W 36/14 455/426.1 |
| 2014/0247810 | A1* | 9/2014 | Bontu et al. ................... 370/332 |
| 2015/0043357 | A1* | 2/2015 | Wong et al. ................... 370/242 |

\* cited by examiner

*Primary Examiner* — Dai A Phuong (57) ABSTRACT

Disclosed are a method and an apparatus for detecting a cell outage and controlling transmission power. The method of detecting the cell outage includes: receiving a Radio Link Failure (RLF) message from a User Equipment (UE) or an adjacent BS; acquiring Reference Signal Received Power (RSRP) and Reference Signal Received Quality (RSRQ) of the UE with respect to a serving cell and adjacent cells before RLF generation, which are included in the RLF message; calculating a Signal to Interference plus Noise Ratio (SINR) of the serving cell by using the acquired RSRP and RSRQ; calculating an SINR of a best adjacent cell having a largest RSRP among the adjacent cells of the UE by using the acquired RSRP and RSRQ; and comparing an SINR of a best cell having a largest SINR between the serving cell and the best adjacent cell with a preset reference value and determining whether the cell outage has been generated.

16 Claims, 6 Drawing Sheets

METHOD AND APPARATUS FOR DETECTING CELL OUTAGE AND CONTROLLING TRANSMISSION POWER

CROSS-REFERENCE TO RELATED APPLICATION(S) AND CLAIM OF PRIORITY

The present application is related to and claims the priority under 35 U.S.C. §119(a) to Korean Application Serial No. 10-2012-0110719, which was filed in the Korean Intellectual Property Office on Oct. 5, 2012 the entire content of which is hereby incorporated by reference.

TECHNICAL FIELD

The present disclosure relates to a method and an apparatus for detecting a cell outage and controlling transmission power to optimize a cell coverage.

BACKGROUND

In general, a Base Station (BS) receives information on intensities of signals, intensities of interference signals from adjacent cells, and a data rate from User Equipments (UEs) located at cell edges and controls transmission power of each cell based on the received information.

By using a transmission power control technology, throughput of the UEs located at the cell edges currently in an in-service state can be improved. However, since a conventional transmission power control technology does not consider a cell outage detection and a cell outage compensation at all, a cell coverage in an out-of-service state cannot be controlled.

Meanwhile, in order to guarantee service quality, a network operator performs a process of optimizing a coverage to resolve the cell outage when installing a system. The cell outage occurs when an intensity of a received signal from a serving cell is low or intensities of interference signals from adjacent cells are high. Accordingly, by controlling transmission power of the cell, a problem of the cell outage can be solved. To solve the problem, at present, cell outage related information such as a position where the cell outage is generated and an intensity of a received signal is collected in a passive manner such as a drive test and transmission power of cells located at an area where the cell outage is generated based on the collected information. The process of optimizing the cell coverage is passively performed, thereby requiring a lot of time and human resources. Accordingly, the process is inefficient and its capability is also unsatisfactory. Therefore, a method is needed in which the system automatically controls the transmission power of the cell by detecting and compensating for the cell outage.

SUMMARY

To address the above-discussed deficiencies, it is a primary object to provide a method and an apparatus for detecting a cell outage and a method and an apparatus for controlling cell transmission power to compensate for the cell outage.

In accordance with an aspect of the present disclosure, a method of detecting a cell outage by a Base Station (BS) is provided. The method includes: receiving a Radio Link Failure (RLF) message from a User Equipment (UE) or an adjacent BS; acquiring Reference Signal Received Power (RSRP) and Reference Signal Received Quality (RSRQ) of the UE with respect to a serving cell and adjacent cells before RLF generation, which are included in the RLF message; calculating a Signal to Interference plus Noise Ratio (SINR) of the serving cell by using the acquired RSRP and RSRQ; calculating an SINR of a best adjacent cell having a largest RSRP among the adjacent cells of the UE by using the acquired RSRP and RSRQ; and comparing an SINR of a best cell having a largest SINR between the serving cell and the best adjacent cell with a preset reference value and determining whether the cell outage has been generated.

In accordance with another aspect of the present disclosure, a method of determining transmission power to compensate for a cell outage by a system manager is provided. The method includes: receiving statistics information related to the cell outage and a number of in/out generations of a User Equipment (UE) and updating conventionally stored information based on the received information; calculating an average number of cell outages based on the received statistics information; determining transmission power to compensate for the cell outage for each cell; and transmitting the determined transmission power to a Base Station (BS).

In accordance with another aspect of the present disclosure, a Base Station (BS) apparatus detecting a cell outage is provided. The BS apparatus includes: a receiver that receives a Radio Link Failure (RLF) message from a User Equipment (UE) or another BS; and a cell outage generation detector that acquires Reference Signal Received Power (RSRP) and Reference Signal Received Quality (RSRQ) of a serving cell and adjacent cells of the UE before RLF generation, which are included in the RLF message, calculating a Signal to Interference plus Noise Ratio (SINR) of the serving cell by using, the acquired RSRP and RSRQ, calculating an SINR of a best adjacent cell having a largest RSRP among the adjacent cells of the UE by using the acquired RSRP and RSRQ, and comparing an SINR of a best cell having a largest SINR between the serving cell and the best adjacent cell with a preset reference value to determine whether the cell outage has been generated.

In accordance with another aspect of the present disclosure, a system manager apparatus determining transmission power to compensate for a cell outage is provided. The system manager apparatus includes: a receiver that receives statistics information related to the cell outage and a number of in/out generations of a User Equipment (UE); a transmission power determiner that and updates conventionally stored information based on the received information, calculates an average number of cell outages based on the received statistics information, and determines transmission power to compensate for the cell outage for each cell; and a transmitter that transmits the determined transmission power to a Base Station (BS).

According to the present disclosure, a cell outage detection probability can be increased by detecting a cell outage by using Reference Signal Received Power (RSRP) and Reference Signal Received Quality (RSRQ) information of a UE with respect to a serving cell and adjacent cells before Radio Link Failure is generated.

Further, according to the present disclosure, a cell outage generation area can be resolved by controlling transmission power of the cell by using RSRP/RSRQ information of the UE with respect to the serving cell and the adjacent cells before the RLF is generated.

In addition, according to the present disclosure, time and human resources spent on optimizing a cell coverage can be reduced in comparison with a manual method using a drive text since a system automatically performs a function of detecting the cell outage and controlling the transmission power.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device. In the following, a detailed description of known functions and configurations incorporated herein will be omitted when it may make the subject matter of the present disclosure unclear.

Hereinafter, embodiments of the present disclosure will be described with reference to the accompanying drawings.

The present disclosure provides a method of detecting a cell outage by using Reference Signal Received Power (RSRP)/Reference Signal Received Quality (RSRQ) information of a UE with respect to a serving cell and adjacent cells before a Radio Link Failure (RLF) is generated and compensating for the cell outage by controlling transmission power of the cells.

Figure 1:
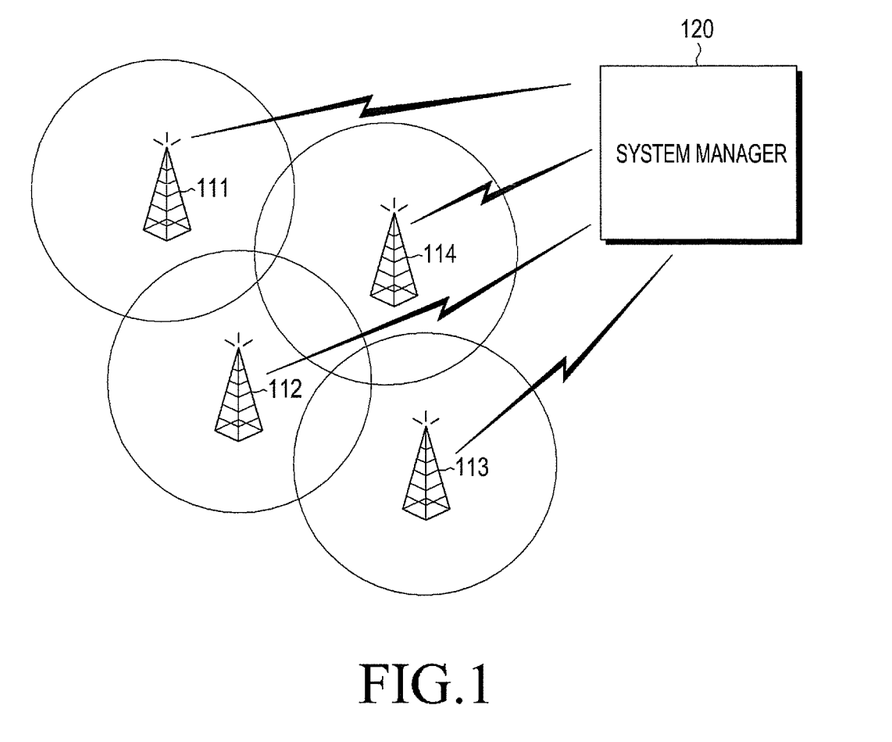
FIG. 1 briefly illustrates a configuration of a network according to embodiments of the present disclosure.

FIG. 1 briefly illustrates a configuration of a network according to embodiments of the present disclosure.

Referring to FIG. 1, the network applied by the present disclosure includes a plurality of Base Stations (BSs) 111 to 114 and a system manager 120. In FIG. 1, one BS manages one cell for the convenience of a description. The BSs 111 to 114 detect a cell outage, collect information related to the cell outage from UEs, and transmit the collected information to the system manager 120. The system manager 120 is located at a core network (not shown) and controls transmission power of each cell to compensate for the cell outage based on information collected from the BS 111 to 114.

Figure 2:
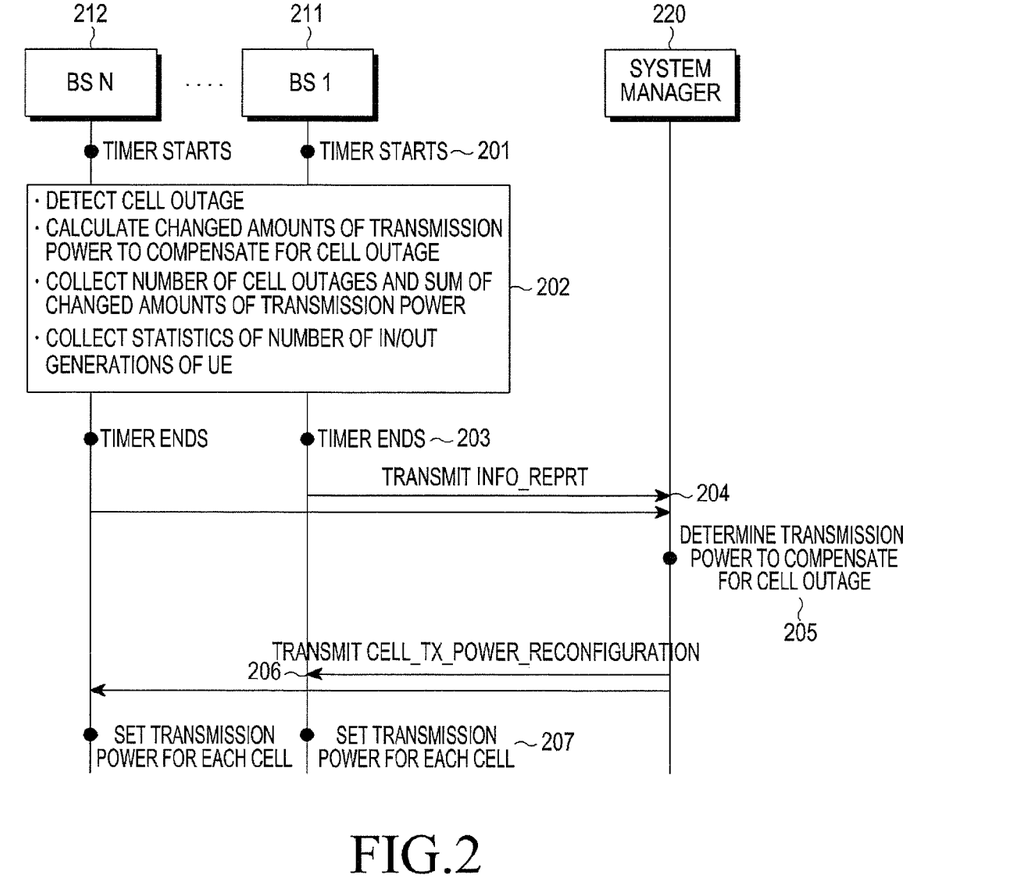
FIG. 2 schematically illustrates an overall operation of detecting and compensating for a cell outage according to embodiments of the present disclosure.

FIG. 2 schematically illustrates an overall operation of detecting and compensating for the cell outage according to embodiments of the present disclosure.

Referring to FIG. 2, N BSs 211 and 212 detect a cell outage, calculate changed amounts of transmission power to compensate for the cell outage, and collect the number of cell outages and a sum of the changed amounts of the transmission power in step 202. Further, the N BSs collect the number of in/out generations of the UE with respect to each cell. A process of collecting the information is performed during a predetermined time from a start of a timer in step 201 to an end of the timer in step 203. When the timer ends in step 203, each of the BSs 211 and 212 inserts collected information on the cell managed by each of the BSs during a predetermined period into an INFO_REPORT message and transmits the INFO_REPORT message to a system manager 220 in step 204. The system manager 220 manages the number of cell outages of each cell, a total of changed amounts of transmission power, and the number of in/out generations of the UE with respect to each cell, and updates the number of cell outages of each cell, the total of changed amounts of transmission power, and the number of in/out generations of the UE with respect to each cell based on information included in the received INFO_REPORT message. Further, the system manager 220 controls transmission power of cells managed by the BS having transmitted the INFO_REPORT message based on the updated information in step 205. In step 206, the system manager 220 transmits a CELL_TX_POWER_RECONFIGURATION message including transmission power of each cell managed by the corresponding BS having transmitted the INFO_REPORT message. Each of the BSs 211 and 212 sets the transmission power included in the CELL_TX_POWER_RECONFIGURATION message as the transmission power of the corresponding cell in step 207. The above process is repeated on a predetermined cycle.

Next, a method of detecting the cell outage, according to embodiments of the present disclosure, is described.

The cell outage detection is performed by the BS managing each cell. The cell outage detection includes a function of detecting the generation of the cell outage, a function of calculating changed amounts of transmission power of the cell to compensate for the cell outage, and a function of collecting and reporting statistics related to the cell outage and in/out of the UE.

The BS performs a function of detecting the generation of the cell outage when the generation of RLF is detected.

Figure 3:
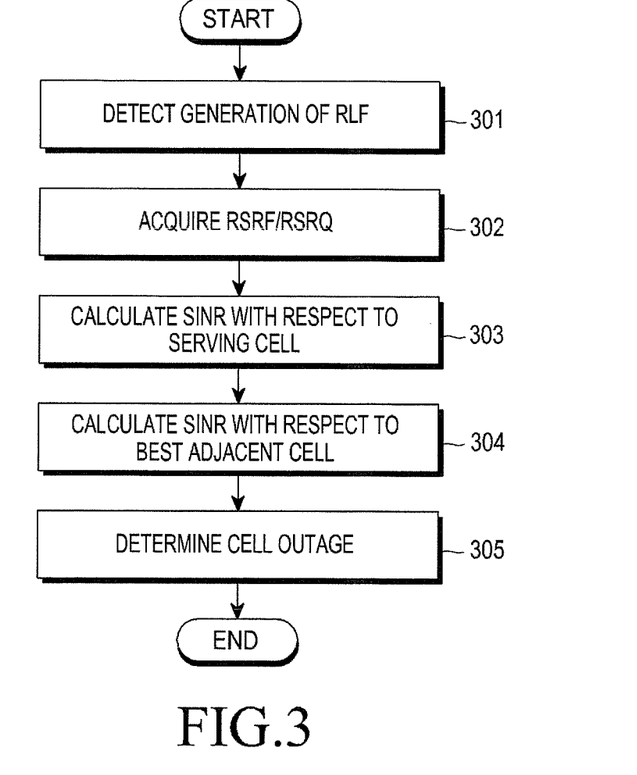
FIG. 3 illustrates a detailed operation related to detecting cell outage generation by a BS according to embodiments of the present disclosure.

FIG. 3 illustrates a detailed operation related to the detection of the generation of the cell outage by the BS according to embodiments of the present disclosure.

Referring to FIG. 3, in step 301, the BS detects the generation of the RLF through an RLF report from the UE or an RLF_INDICATION message from an adjacent BS. In step 302, the BS acquires RSRP/RSRQ information of the UE with respect to the serving cell and the adjacent cells before the RLF is generated, which is included in the received RLF report or in the RLF_INDICATION message.

In step 303, the BS calculates a Signal to Interference plus Noise Ratio (SINR) of the UE with respect to the serving cell (SINRrlf_servcell) before the RLF is generated by using Equation (1):

$$\text{SINRrlf\_servcell} = \text{RSRQrlf\_servcell}/(1-\text{RSRQrlf\_servcell}) \tag{1}$$

In Equation (1), RSRQrlf_servcell denotes RSRQ of the UE with respect to the serving cell before the RLF is generated.

In step 304, the BS calculates an SINR of the UE with respect to a best adjacent cell (SINRbest_nbrcell) before the RLF is generated by using Equation (2):

$$\text{SINRbest\_nbrcell} = \text{RSRPbest\_nbrcell} * \text{RSRQrlf\_servcell}/(\text{RSRPrlf\_servcell} - \text{RSRPbest\_nbrcell} * \text{RSRQrlf\_servcell}) \tag{2}$$

In Equation (2), RSRPrlf_servcell denotes RSRP of the UE with respect to the serving cell before the RLF is generated, RSRQrlf_servcell denotes RSRQ of the UE with respect to the serving cell before the RLF is generated, RSRPbest_nbrcell denotes RSRP of the UE with respect to the best adjacent cell before the RLF is generated, and RSRQbest_nbrcell denotes RSRQ of the UE with respect to the best adjacent cell before the RLF is generated. The best adjacent cell refers to an adjacent cell having largest RSRP before the RLF is generated among adjacent cells of the UE.

In step 305, the BS determines whether the cell outage is generated. When the SINR of a best cell is equal to or smaller than a preset SINRoutage, the BS determines that the cell outage has been generated in the best cell. The best cell refers to a cell having a largest SINR between the serving cell and the best adjacent cell.

When the generation of the cell outage is detected through the steps of FIG. 3, the BS calculates changed amounts of transmission power to compensate for the corresponding cell.

Figure 4:
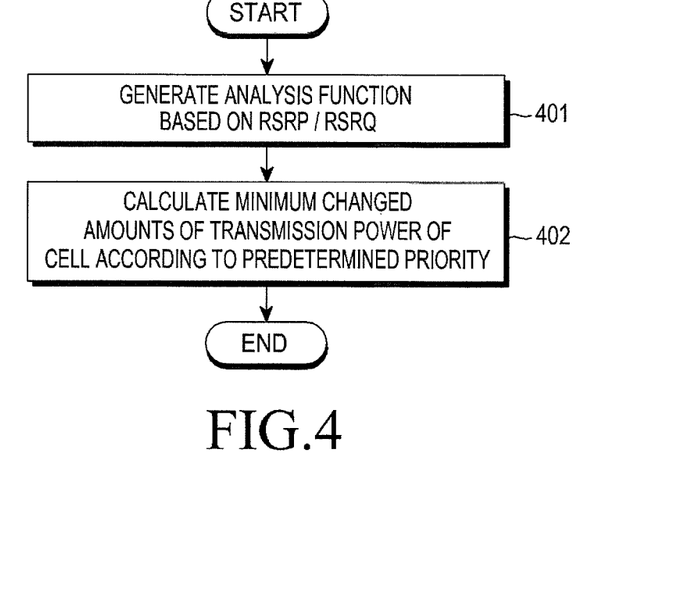
FIG. 4 illustrates an operation of calculating changed amounts of transmission power of a cell to compensate for a cell outage of a BS according to embodiments of the present disclosure.

FIG. 4 illustrates an operation of calculating changed amounts of transmission power of the cell to compensate for the cell outage by the BS according to embodiments of the present disclosure. Referring to FIG. 4, the BS generates an analysis function (AnalysisFunction) shown in Equation (3) below by using, the RSRP/RSRQ information acquired through the RLF report or the RLF_INDICATION message in step 401.

$$AnalysisFunction = \frac{RSRP_{rlf\_servcell}}{RSRP_{best\_nbrcell} + \frac{RSRP_{rlf\_servcell}}{RSRQ_{rlf\_servcell}} - \left(RSRP_{servcell} + \sum_{i \in nbrcell} RSRP_i\right)} \tag{3}$$

In Equation (3), RSRPrlf_servcell denotes RSRP of the UE with respect to the serving cell before the RLF is generated, RSRQrlf_servcell denotes RSRQ of the UE with respect to the serving cell before the RLF is generated, RSRPbest_nbrcell denotes RSRP of the UE with respect to the best adjacent cell before the RLF is generated, RSRQbest_nbrcell denotes RSRQ of the UE with respect to the best adjacent cell before the RLF is generated, and RSRPi denotes RSRP of the UE with respect to a cell i before the RLF is generated.

In step 402, the BS calculates minimum changed amounts of transmission power of the cell satisfying Equation (4) according to a predetermined priority.

$$AnalysisFunction \leq SINRoutage \tag{4}$$

The priority can be determined as follows:

Priority 1: increase transmission power of the UE with respect to the serving cell before the RLF is generated;

Priority 2: increase transmission power of the UE with respect to the serving cell before the RLF is generated and decrease transmission power of the UE with respect to the best adjacent cell before the RLF is generated; and Priority 3: decrease transmission power of the UE with respect to the best adjacent cell before the RLF is generated.

Figure 5:
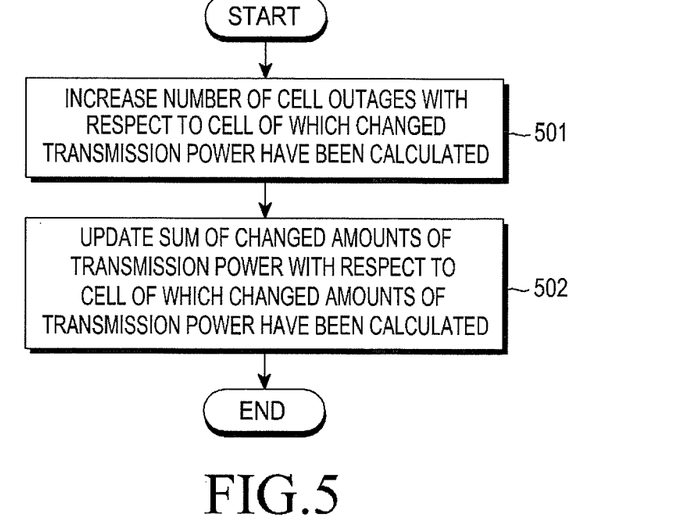
FIG. 5 illustrates a process of collecting statistics of the number of cell outages of a BS and a sum of changed amounts of transmission power according to embodiments of the present disclosure.

FIG. 5 illustrates a process of collecting statistics of the number of cell outages and a sum of the changed amounts of the transmission power by the BS according to embodiments of the present disclosure.

Referring to FIG. 5, after calculating changed amounts of transmission power of the corresponding cell to compensate for the cell outage through the steps of FIG. 4, in step 501, the BS increases the number of outages of the cell of which the changed amounts of the transmission power have been calculated by 1. In step 502, the BS updates a sum of the changed amounts of the transmission power with respect to the cell of which the changed amounts of the transmission power have been calculated, based on Equation (5):

$$\begin{aligned}(\text{sum of changed amounts of transmission power}) = \\ (\text{sum of changed amounts of transmission} \\ \text{power}) + (\text{calculated changed amounts of trans-} \\ \text{mission power})\end{aligned} \tag{5}$$

The process of collecting the statistics of the number of cell outages and the sum of changed amounts of transmission power is performed by driving a timer during a predetermined period.

Thereafter, when the following events are generated during a predetermined period, the BS increases the number of in/out generations of the UE with respect to the related cell by 1 and collects statistics of the number of in/out generations of the UEs:

the event where the UE enters (hands in) the corresponding cell;

the event where the UE performs a process of Radio Resource Control (RRC) Connection Reestablishment to the corresponding cell due to a handover failure or another failure;

the event where the UE attempts a handover from the corresponding cell to another cell, the attempt of the handover refers to transmission of a HANDOVER REQUEST message from the corresponding cell to another cell; and the event where the UE performs TooLateHORLFBeforeTriggering in a state where the corresponding cell is the serving cell, TooLateHORLFBeforeTriggering refers to a case where the RLF is generated between the serving cell and the UE before the serving cell receives a measurement report message from the UE.

When the timer stops and the predetermined period expires, the BS transmits the collected statistics information on the cell outage and in/out of the UE with respect to cells managed by the BS to the system manager through the INFO_REPORT message.

Table 1 shows an example of a type of the INFO_REPORT message according to embodiments of the present disclosure:

TABLE 1

| Fields of INFO_REPORT | Comments |
|---|---|
| Message Type | 0: INFO_REPORT |
| Sender eNBID | ID of the, BS transmitting the INFO_REPORT message |
| NumReportedCell | The number of reported cells |
| For(j=0; j<NumReportedCell; j++) | |
| { | |
| eNBIDj | ID of the BS of a reported $j^{th}$ cell |
| CellIDj | ID of the reported $j^{th}$ cell |
| NumInOutUEj | Sum of the number of in/out generations of the UE with respect to the reported $j^{th}$ cell during a predetermined time |
| NumOutagej | The number of cell outages with respect to the reported $j^{th}$ cell during a predetermined period |
| SumPowerChangej | Sum of changed amounts of cell outage transmission power with respect to the reported $j^{th}$ cell during a predetermined period |
| } | |

Thereafter, in order to collect the statistics of the cells managed by the BS, the BS initializes statistics values related to the cell outage and in/out of the UE and drives the timer again.

Next, a method of controlling transmission power of the cell to compensate for the cell outage, according to embodiments of the present disclosure, is described.

When the system manager receives information on the statistics related to the cell outage and in/out of the UE with respect to the cells managed by the BS having transmitted the INFO_REPORT message through the INFO_REPORT message, the system manager performs a process of controlling transmission power of the corresponding cell to compensate for the cell outage.

Further, the system manager stores information including the number of cell outages and the sum of changed amounts of transmission power on the statistics related to the cell outages with respect to the cells managed by the BS having transmitted the INFO_REPORT message and the number of in/out generations of the UE. The number of cell outages with respect to the corresponding cell is updated to a value generated by adding a sum of the numbers of cell outages of the corresponding cell stored up to now and the collected number of cell outages. Similarly, the sum of a total of the changed amounts of the transmission power of the corresponding cell to compensate for the cell outage is updated to a value generated by adding a sum of a total of the changed amounts of transmission power stored up to now and the collected sum of the changed amounts of the transmission power.

Further, the system manager calculates the average number of cell outages for the current transmission power with respect to the cells managed by the BS having transmitted the INFO_REPORT message based on the collected information through Equation 6 below:

(average number of cell outages)=$a$*(average number of cell outages)+(1−$a$)*(sum of the numbers of cell outages)/(number of in/out generations of UE)  (6)

Further, the system manager performs a process of determining transmission power to compensate for the cell outage with respect to the cells managed by the BS having transmitted the INFO_REPORT message based on the collected information.

Figure 6:
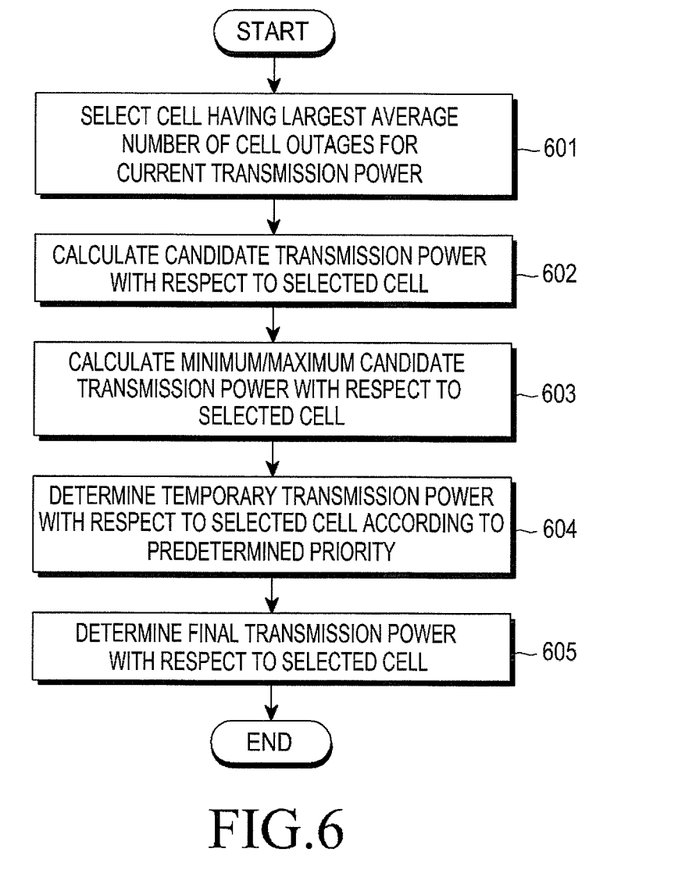
FIG. 6 illustrates an operation of controlling transmission power to compensate for a cell outage performed by a system manager according to embodiments of the present disclosure.

FIG. 6 illustrates an operation of controlling transmission power to compensate for the cell outage performed by the system manager according to embodiments of the present disclosure.

Referring to FIG. 6, in step 601, the system manager selects a cell having the largest average number of cell outages with respect to the current transmission power from cells for which the process of determining the transmission power has not been performed. In step 602, the system manager calculates candidate transmission power with respect to the cell selected in step 601 through Equation (7):

(candidate transmission power)=(current transmission power)+(sum of total of changed amounts of transmission power)/sum of numbers of cell outages)  (7)

However, candidate transmission power=maximum transmission power of the cell when the candidate transmission power is equal to or larger than the maximum transmission power of the cell, and candidate transmission power=minimum transmission power of the cell when the candidate transmission power is equal to or smaller than the minimum transmission power of the cell.

Subsequently, in step 603, the system manager calculates candidate maximum/minimum transmission power with respect to the cell selected in step 601 by using the current transmission power and the candidate transmission power based on Equation (8) below:

Minimum candidate transmission power=MIN(current transmission power,candidate transmission power)

(1) The case where the number of in/out generations of the UE for the current transmission power with respect to the corresponding cell is equal to or larger than a threshold:

Minimum Maximum candidate transmission power=MAX(current transmission power,candidate transmission power)

(2) The case where the number of in/out generations of the UE for the current transmission power with respect to the corresponding cell is smaller than the threshold:

Minimum candidate transmission power=current transmission power

Maximum candidate transmission power=current transmission power  (8)

In step 604, temporary transmission power with respect to the cell selected in step 601 is determined within a range of [minimum candidate transmission power and maximum candidate transmission power] according the following priority:

Priority 1: select a transmission power closest to a candidate transmission power from transmission powers having an average number of cell outages which is smaller than the average number of cell outages for the current transmission power;

Priority 2: select transmission power having no statistics of the average number of cell outages closest to the average number of cell outages for the current transmission power; and Priority 3: select current transmission power as temporary transmission power.

For example, when the average number of cell outages for each transmission power is as shown in Table 2, if current transmission power=39 dBm and candidate transmission power=43 dBm, temporary transmission power=41 dBm according to priority 1. Further, when current transmission power=43 dBm and candidate transmission power=39 dBm, temporary transmission power=39 dBm according to priority 1.

TABLE 2

| | Transmission power | | | | |
|---|---|---|---|---|---|
| | 39 dBm | 40 dBm | 41 dBm | 42 dBm | 43 dBm |
| The average number of cell outages | 0.5 | 0.2 | 0.3 | NULL | 0.7 |

When the average number of cell outages for each transmission power of the cell is as shown in Table 3, if current transmission power=39 dBm and candidate transmission power=43 dBm, temporary transmission power=40 dBm according to priority 2.

TABLE 3

| | Transmission power | | | | |
|---|---|---|---|---|---|
| | 39 dBm | 40 dBm | 41 dBm | 42 dBm | 43 dBm |
| The average number of cell outages | 0.5 | NULL | 0.7 | NULL | 0.6 |

When the average number of cell outages for each transmission power of the cell is as shown in Table 4, if current transmission power=43 dBm and candidate transmission power=39 dBm, temporary transmission power=42 dBm according to priority 2.

TABLE 4

| | Transmission power | | | | |
|---|---|---|---|---|---|
| | 39 dBm | 40 dBm | 41 dBm | 42 dBm | 43 dBm |
| The average number of cell outages | 0.6 | NULL | 0.7 | NULL | 0.5 |

In Tables 2 to 4, NULL denotes no statistics of the average number of cell outages for the corresponding transmission power.

In step 605, final transmission power with respect to the cell selected in step 601 is selected in consideration of whether transmission power of adjacent cells has been changed. That is, final transmission power=current transmission power when there is a cell of which the final transmission power has been already determined to be reduced in the adjacent cells, and final transmission power=temporary transmission power when there is no cell of which the final transmission power has been already determined to be reduced in the adjacent cells.

The system manager repeats steps 601 to 605 until the transmission power of all the cells managed by the BS having transmitted the INFO_REPORT message is completely determined.

The system manager transmits the final transmission power of the cells determined by the steps of FIG. 6 through a CELL_TX_POWER_RECONFIGURATION message. Table 5 is an example of a type of the CELL_TX_POWER_RECONFIGURATION message.

TABLE 5

| Fields of CELL_TX_POWER_RECONFIGURATION | Comments |
|---|---|
| Message Type | 1: CELL_TX_POWER_RECONFIGURATION |
| eNBID | ID of the BS receiving the CELL_TX_POWER_RECONFIGURATION message |
| NumCell | The number of cells managed by the BS having the corresponding eNBID |
| For(j=0; j<NumCell; j++) { | |
|   CellIDj | ID of the $j^{th}$ cell whose final transmission power is reported |
|   TxPdBmj,r | Transmission power with respect to the $j^{th}$ cell whose final transmission power is reported |
| } | |

The BS having received the CELL_TX_POWER_RECONFIGURATION message from the system manager compares the current transmission power with respect to each cell managed by the BS with the final transmission power included in the CELL_TX_POWER_RECONFIGURATION message, and sets the corresponding final transmission power included in the CELL_TX_POWER_RECONFIGURATION message as the transmission power of the corresponding cell when the two transmission powers are different from each other.

Figure 7:
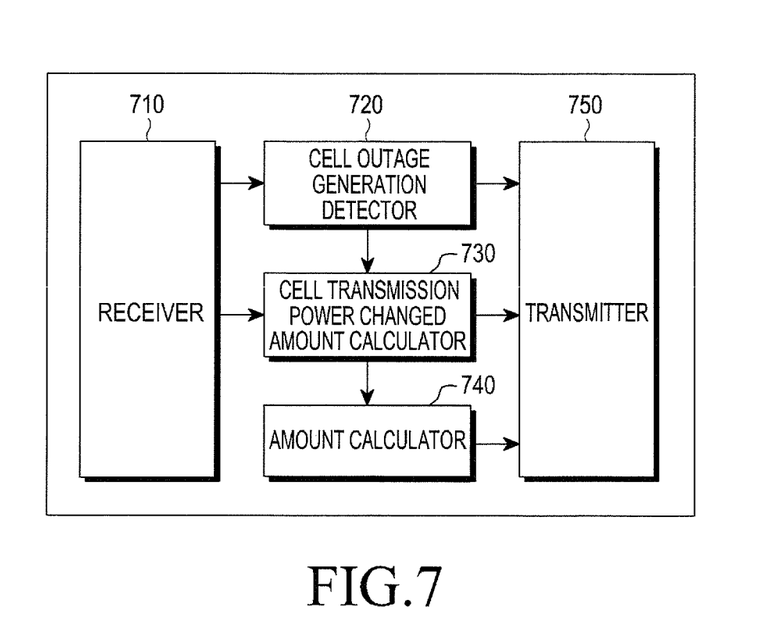
FIG. 7 illustrates a BS apparatus according to embodiments of the present disclosure.

FIG. 7 illustrates a configuration of the BS according to embodiments of the present disclosure.

Referring to FIG. 7, a receiver 10 receives a message for reporting the RLF from the UE or another adjacent BS and transmits the message to a cell outage generation detector 720 and a cell transmission power changed amount calculator 730. The cell outage generation detector 720 determines whether the cell outage has been generated through the steps of FIG. 3 and transmits a result thereof to a transmitter 750.

The cell transmission power changed amount calculator 730 calculates changed amounts of transmission power of the cell to compensate for the cell outage through the steps of FIG. 4 and transmits the changed amounts to the transmitter 750. A statistics collector 740 collects statistics of the number of cell outages and the sum of the changed amounts of the transmission power through the steps of FIG. 5 and statistics of the number of in/out generations of the UE, and transmits the collected information to the transmitter 750. The transmitter 750 transmits the information received from the cell transmission power changed amount calculator 730 and the statistics collector 740 to the system manager through the INFO_REPORT message as shown in Table 1.

Figure 8:
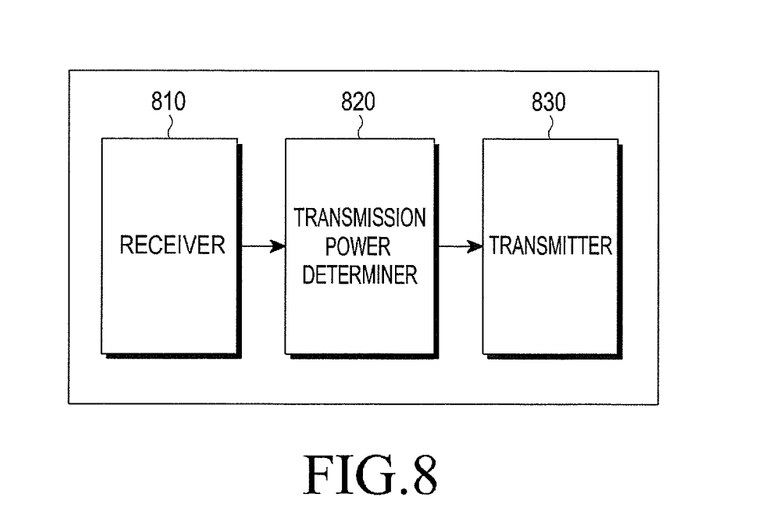
FIG. 8 illustrates a system manager apparatus according to embodiments of the present disclosure.

FIG. 8 illustrates a configuration of the system manager according to embodiments of the present disclosure.

Referring to FIG. 8, a receiver 810 receives the INFO_REPORT message from the BSs, and a transmission power determiner 810 stores statistics related to the cell outage and in/out generation of the UE included in the INFO_REPORT message in a storage unit (not shown), calculates the average number of cell outages based on Equation (5), and determines transmission power of the cell to compensate for the cell outage through the steps of FIG. 6. A transmitter 830 transmits the transmission power of the cell determined by the transmission power determiner 820 to the BS through the CELL_TX_POWER_RECONFIGURATION message as shown in Table 5.

The aforementioned embodiments are understood as examples of the present disclosure. It may be understood that all features described in associated with one of the aforementioned embodiments may be used alone, combined with other described features, combined with one or more features of another embodiment of the aforementioned embodiments, or combined with different embodiments of the aforementioned embodiments. Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of detecting a cell outage by a Base Station (BS), the method comprising:
   receiving a Radio Link Failure (RLF) message from a User Equipment (UE) or an adjacent BS;
   acquiring Reference Signal Received Power (RSRP) and Reference Signal Received Quality (RSRQ) of the UE with respect to a serving cell and adjacent cells before RLF generation, which are included in the RLF message;
   calculating a Signal to Interference plus Noise Ratio (SINR) of the serving cell by using the acquired RSRP and RSRQ;
   calculating an SINR of an adjacent cell having a largest RSRP among the adjacent cells of the UE by using the acquired RSRP and RSRQ; and
   comparing an SINR of a cell having a largest SINR between the SINR of the serving cell and the SINR of the adjacent cell with a preset reference value to determine whether the cell outage has been generated.

2. The method of claim 1, wherein the calculating of the SINR of the serving cell is performed based on an equation of $$SIN_{rlf\_servcell} = RSRQ_{rlf\_servcell}/(1-RSRQ_{rlf\_servcell})$$

where $RSRQ_{rlf\_servcell}$ denotes RSRQ of the UE with respect to the serving cell before the RLF generation.

3. The method of claim 1, wherein the calculating of the SINR of the best adjacent cell is performed based on an equation of
$SINRbest\_nbrcell = RSRPbest\_nbrcell*RSRQrlf\_servcell/(RSRPrlf\_servcell - RSRP\_best\_nbrcell*RSRQrlf\_servcell)$,
where RSRPrlf_servcell denotes RSRP of the UE with respect to the serving cell before the RLF generation, RSRQrlf_servcell denotes RSRQ of the UE with respect to the serving cell before the RLF generation, RSRPbest_nbrcell denotes RSRP of the UE with respect to the adjacent cell before the RLF generation, and RSRQbest_nbrcell denotes RSRQ of the UE with respect to the adjacent cell before the RLF generation.

4. The method of claim 1, wherein when the SINR of the cell is equal to or smaller than a threshold, it is determined that the cell outage has been generated in the cell.

5. The method of claim 1, further comprising:
   calculating changed amounts of transmission power to compensate for the cell outage by using the acquired RSRP and RSRQ;
   collecting statistics of numbers of cell outages of the serving cell and the adjacent cells and a sum of changed amounts of transmission power;
   collecting statistics of a number of in/out generations of the UE with respect to the corresponding cell; and
   reporting the calculated changed amounts of the transmission power and the collected statistics to a system manager.

6. The method of claim 5, wherein the calculating of the changed amounts of the transmission power comprises: generating an analysis function (AnalysisFunction) according to an equation of AnalysisFunction=RSRP rlf_servcell RSRP best_nbrcell+RSRP rlf_servcell RSRQ rlf_servcell−(RSRP servcell+i .di-elect cons. nbrcell RSRP i); ##EQU00002##
and calculating minimum changed amounts of transmission power allowing the analysis function to be equal to or smaller than the threshold according to a predetermined priority, where RSRPrlf_servcell denotes RSRP of the UE with respect to the serving cell before the RLF generation, RSRQrlf_servcell denotes RSRQ of the UE with respect to the serving, cell before the RLF generation, RSRPbest_nbrcell denotes RSRP of the UE with respect to the adjacent cell before the RLF generation, RSRQbest_nbrcell denotes RSRQ of the UE with respect to the adjacent cell before the RLF generation, and RSRP.sub.i denotes RSRP of the UE with respect to a cell i before the RLF generation.

7. The method of claim 5, wherein the priority first increases transmission power of the UE with respect to the serving cell before the RLF generation, decreases transmission power of the UE with respect to the adjacent cell before the RLF generation simultaneously with increasing the transmission power of the UE with respect to the serving cell before the RLF generation, and then decreases transmission power of the UE with respect to the adjacent cell before the RLF generation.

8. The method of claim 5, wherein the collecting of the statistics of the number of in/out generations of the UE with respect to the corresponding cell comprises increasing the number of in/out generations of the UE with respect to the corresponding cell by 1 when the UE enters the corresponding cell, the UE performs a radio resource control (RRC) connection re-establishment process to the corresponding cell, the UE attempts a handover from the corresponding cell to another cell, or the corresponding cell is the serving cell and RTF is generated before the serving cell receives a measurement report message from the UE.

9. A Base Station (BS) apparatus detecting a cell outage, the BS comprising:
- a receiver that receives a Radio Link Failure (RLF) message from a User Equipment (UE) or another BS; and
- a cell outage generation detector that acquires Reference Signal Received Power (RSRP) and Reference Signal Received Quality (RSRQ) of a serving cell and adjacent cells of the UE before RLF generation, which are included in the RLF message, calculating a Signal to Interference plus Noise Ratio (SINR) of the serving cell by using the acquired RSRP and RSRQ, calculating, an SINR of an adjacent cell having a largest RSRP among the adjacent cells of the UE by using the acquired RSRP and RSRQ, and
- comparing an SINR of a cell having a largest SINR between the SINR of the serving cell and the SINR of the adjacent cell with a preset reference value to determine whether the cell outage has been generated.

10. The BS apparatus of claim 9, wherein the cell outage generation detector calculates the SINR of the serving cell according to an equation of $$SIN_{rlf\_servcell} = \frac{RSRQ_{rlf\_servcell}}{(1 - RSRQ_{rlf\_servcell})},$$

where $RSRQ_{rlf\_servcell}$ denotes RSRQ of the UE with respect to the serving cell before the RLF generation.

11. The BS apparatus of claim 9, wherein the cell outage generation detector calculates the SINR of the serving cell according to an equation of SINRbest_nbrcell=RSRPbest_nbrcell*RSRQrlf_servcell/(RSRPrlf_servcell-R-SRPbest_nbrcell*RSRQrlf_servcell), where RSRPrlf_servcell denotes RSRP of the UE with respect to the serving cell before the RLF generation, RSRQrlf_servcell denotes RSRQ of the UE with respect to the serving cell before the RLF generation, RSRPbest_nbrcell denotes RSRP of the UE with respect to the adjacent cell before the RLF generation, and RSRQbest_nbrcell denotes RSRQ of the UE with respect to the adjacent cell before the RLF generation.

12. The BS apparatus of claim 9, wherein, when the SINR of the cell is equal to or smaller than a threshold, the cell outage generation detector determines that the cell outage has been generated in the cell.

13. The BS apparatus of claim 9, further comprising:
- a cell transmission power changed amount calculator that calculates a changed amount of transmission power to compensate for the cell outage by using the acquired RSRP and RSRQ;
- a statistics collector that collects statistics of numbers of cell outages of the serving cell and the adjacent cells and a sum of changed amounts of transmission power and collects statistics of a number of in/out generations of the UE with respect to the corresponding, cell; and
- a transmitter that reports the calculated changed amount of the transmission power and the collected statistics to a system manager.

14. The BS apparatus of claim 13, wherein the transmission power changed amount calculator generates an analysis function (AnalysisFunction) according to an equation of AnalysisFunction=RSRP rlf_servcell RSRP best_nbrcell+ RSRP rlf_servcell RSRQ rlf_servcell−(RSRP servcell+i .dielect cons. nbrcell RSRP i); ##EQU00003## and calculates a minimum changed amount of transmission power allowing the analysis function to be equal to or smaller than the threshold according to a predetermined priority, where RSRPrlf_servcell denotes RSRP of the UE with respect to the serving cell before the RLF generation, RSRQrlf_servcell denotes RSRQ of the UE with respect to the serving cell before the RLF generation, RSRPbest_nbrcell denotes RSRP of the UE with respect to the adjacent cell before the RLF generation, RSRQbest_nbrcell denotes RSRQ of the UE with respect to the adjacent cell before the RLF generation, and RSRP.sub.i denotes RSRP of the UE with respect to a cell i before the RLF generation.

15. The BS apparatus of claim 13, wherein the priority first increases transmission power of the UE with respect to the serving cell before the RLF generation, decreases transmission power of the UE with respect to the adjacent cell before the RLF generation simultaneously with increasing the transmission power of the UE with respect to the serving cell before the RLF generation, and then decreases transmission power of the UE with respect to the adjacent cell before the RLF generation.

16. The BS apparatus of claim 13, wherein the statistics collector collects the statistics of the number of in/out generations of the UE with respect to the corresponding cell by increasing the number of in/out generations of the UE with respect to the corresponding cell by 1 when the UE enters the corresponding cell, the UE performs a radio resource control (RRC) connection re-establishment process to the corresponding cell, the UE attempts a handover from the corresponding cell to another cell, or the corresponding cell is the serving cell and RLF is generated before the serving cell receives a measurement report message from the UE.

* * * * *